(12) United States Patent
Steinberg

(10) Patent No.: US 11,971,352 B2
(45) Date of Patent: Apr. 30, 2024

(54) METHOD AND APPARATUS FOR THE APPLICATION OF FORCE TO A SAMPLE USING OPTICAL INTERROGATION TECHNIQUE

(71) Applicant: Thermo Electron Scientific Instruments LLC, Madison, WI (US)

(72) Inventor: Peter Steinberg, Hillsboro, OR (US)

(73) Assignee: Thermo Electron Scientific Instruments LLC, Madison, WI (US)

(*) Notice: Subject to any disclaimer, the term of this patent is extended or adjusted under 35 U.S.C. 154(b) by 0 days.

(21) Appl. No.: 17/812,490

(22) Filed: Jul. 14, 2022

(65) Prior Publication Data

US 2023/0016736 A1     Jan. 19, 2023

Related U.S. Application Data

(60) Provisional application No. 63/222,514, filed on Jul. 16, 2021.

(51) Int. Cl.
| | |
|---|---|
| *G01N 21/552* | (2014.01) |
| *G01L 1/22* | (2006.01) |
| *G01N 21/25* | (2006.01) |
| *G01N 21/35* | (2014.01) |

(52) U.S. Cl.
CPC .............. *G01N 21/552* (2013.01); *G01L 1/22* (2013.01); *G01N 21/255* (2013.01); *G01N 21/35* (2013.01); *G01N 2021/3595* (2013.01)

(58) Field of Classification Search
CPC ......................... G01L 1/22; G01N 2201/1218
See application file for complete search history.

(56) References Cited

FOREIGN PATENT DOCUMENTS

WO    WO-2014204668 A1 * 12/2014 ......... G01N 21/3563

* cited by examiner

*Primary Examiner* — Tri T Ton
(74) *Attorney, Agent, or Firm* — BakerHostetler

(57) ABSTRACT

A measurement system configured to examine a sample. The system comprises an internally reflective element, a contact member, an actuator, an optical assembly, a sensor, and a controller. The contact member and the reflective element are configured to apply a force to the sample. The optical assembly is configured to scan the sample. Whereby prior to the scan, an initial force is applied to the sample, and after the scan, a resulting force is applied to the sample. The sensor is configured to detect the resulting force applied to the sample, and the controller is configured to receive a signal from the sensor indicative of the detected resulting force. The controller is further configured to control the actuator to adjust the force applied to the sample by the contact member and the internally reflective element from the resulting force to the initial force.

13 Claims, 5 Drawing Sheets

METHOD AND APPARATUS FOR THE APPLICATION OF FORCE TO A SAMPLE USING OPTICAL INTERROGATION TECHNIQUE

CROSS REFERENCE TO RELATED APPLICATIONS

This application claims priority to and the benefit of U.S. Provisional Application No. 63/222,514 (filed on Jul. 16, 2021), the disclosure of which is incorporated herein by reference in its entirety for any and all purposes.

TECHNICAL FIELD

This disclosure relates generally to spectroscopy, more particularly, to an optical interrogation system and method to provide a desired contact pressure onto a sample.

BACKGROUND

Attenuated total reflectance (ATR) is an optical interrogation technique often used in conjunction with infrared spectroscopy (e.g., Fourier Transform Infrared (FTIR)), which enables samples to be examined directly in a solid, liquid or a gas state. In particular, ATR capitalizes on total internal reflected light produced at the interface of a configured internally reflecting element (IRE) and a coupled sample plane. In operation, a beam of light (e.g., infrared (IR)) is passed through an IRE crystal (or ATR crystal) in such a way that it reflects at least once off of the internal surface in contact with a sample. This reflection forms an evanescent wave which extends into the sample, often up to about 2 microns, with the exact value being determined by the wavelength of light, the angle of incidence and the indices of refraction for the IRE crystal and the sample medium being interrogated. The reflected beam, which carries the spectral information of the sample, is thereafter interrogated for analysis via, for example, a single pixel, linear array or 2-dimensional array detector.

The samples, primarily the solid samples to be interrogated using ATR as the investigation technique, can come in the form of many different shapes and sizes. In order to enable efficient optical coupling, a force is applied to such samples with a configured stage mechanism that is designed to provide intimate contact with an optical component, such as a Diamond, Silicon, or Germanium (Ge) ATR element. Conventional stages include pressure mechanisms that include mechanical screws, levers, slides, and actuators that are designed to apply compressive forces on a given sample.

However, when performing typical ATR measurements, the samples can deform resulting in degradation in the measurements over successive scans due to, for example, reduced tip contact between the IRE crystal and the sample.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein.

SUMMARY

The foregoing needs are met by the ATR measurement system described herein. The ATR measurement system can use a firmware-controlled z-axis stage and sensitive load cell (and/or strain gauge) to maintain contact pressure between an ATR tip and the sample. A controller of the ATR measurement system can control the z-axis stage to maintain the contact between the ATR tip and the sample by automatically raising the z-axis stage in a dead time between scans of a multiple scan acquisition.

As will be further explained herein, maintaining the contact and applied force and/or pressure between the ATR tip and the sample can result in improved sample testing and identification.

An aspect of the present disclosure provides a measurement system for examining a sample. The measurement system can include an internally reflective element, a contact member, an actuator, an optical assembly, a sensor, and a controller. The internally reflective element can include a contact surface configured to support the sample. The contact member can be positioned adjacent to (e.g., axially above) the internally reflective element, where the contact member and the internally reflective element are configured to apply a force to the sample when the sample is positioned on the contact surface and the contact member is in contact with the sample. The actuator can be configured to adjust the force applied to the sample by the contact member and the internally reflective element.

The optical assembly can include a light source and a light detector. The optical assembly can be configured to scan the sample by directing source light from the light source towards the contact surface and detecting source light optically interacting with the contact surface by the light detector. Prior to the scan, an initial force can be applied to the sample by the contact member and the internally reflective element. After the scan, a resulting force is applied to the sample by the contact member and the internally reflective element.

The sensor can be configured to detect the resulting force applied to the sample by the contact member and the internally reflective element. The controller can be configured to receive a signal from the sensor indicative of the detected resulting force. The controller can be further configured to control the actuator to adjust the force applied to the sample by the contact member and the internally reflective element from the resulting force to the initial force.

Another aspect of the present disclosure provides a method for examining a sample with a measurement system. The method can include: positioning a sample on a contact surface of an internally reflective element; contacting the sample by a contact member positioned adjacent to (e.g., axially above) the internally reflective element; applying a force to the sample with the contact member and the internally reflective element; scanning the sample by an optical assembly comprising a light source and a light detector, the scanning including: directing source light from the light source towards the contact surface, and detecting source light optically interacting with the contact surface by the light detector, where prior to the scan, an initial force is applied to the sample by the contact member and the internally reflective element, and where after the scan, a resulting force is applied to the sample by the contact member and the internally reflective element, where the resulting force is different than the initial force; detecting, by a sensor, the resulting force applied to the sample by the contact member and the internally reflective element; and adjusting, by an actuator, the force applied to the sample by the contact member and the internally reflective element from the resulting force to the initial force.

Another aspect of the present disclosure provides an attenuated total reflectance measurement system for examining a sample. The measurement system can include: a stage, a contact member, an actuator, an optical assembly, a sensor, and a controller. The stage can include an internally reflective element coupled to the stage such that axial movement between the stage and the internally reflective element is substantially fixed. The internally reflective element can include a contact surface configured to support the sample. The contact member can be positioned adjacent to (e.g., axially above) the internally reflective element, although this is not a requirement. The contact member and the internally reflective element can be configured to apply a pressure to the sample when the sample is positioned on the contact surface and the contact member is in contact with the sample. The actuator can be configured to adjust a height of the stage to affect the pressure applied to the sample by the contact member and the internally reflective element.

The optical assembly can include a light source and a light detector. The optical assembly can be configured to scan the sample by directing light towards the contact surface and detecting the source light optically interacting with the contact surface. Prior to the scan, an initial pressure can be applied to the sample by the contact member and the internally reflective element. After the scan, a resulting pressure can be applied to the sample by the contact member and the internally reflective element.

The sensor can be configured to detect the resulting pressure applied to the sample by the contact member and the internally reflective element. The controller can be configured to receive a signal from the sensor indicative of the detected resulting pressure, where the controller is further configured to control the actuator to adjust the height of the stage to change the pressure applied to the sample by the contact member and the internally reflective element from the resulting pressure to the initial pressure.

This summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there are shown in the drawings illustrative embodiments of the disclosure. It should be understood, however, that the application is not limited to the precise arrangements and instrumentalities shown. In the drawings.

DETAILED DESCRIPTION

Figure 1:
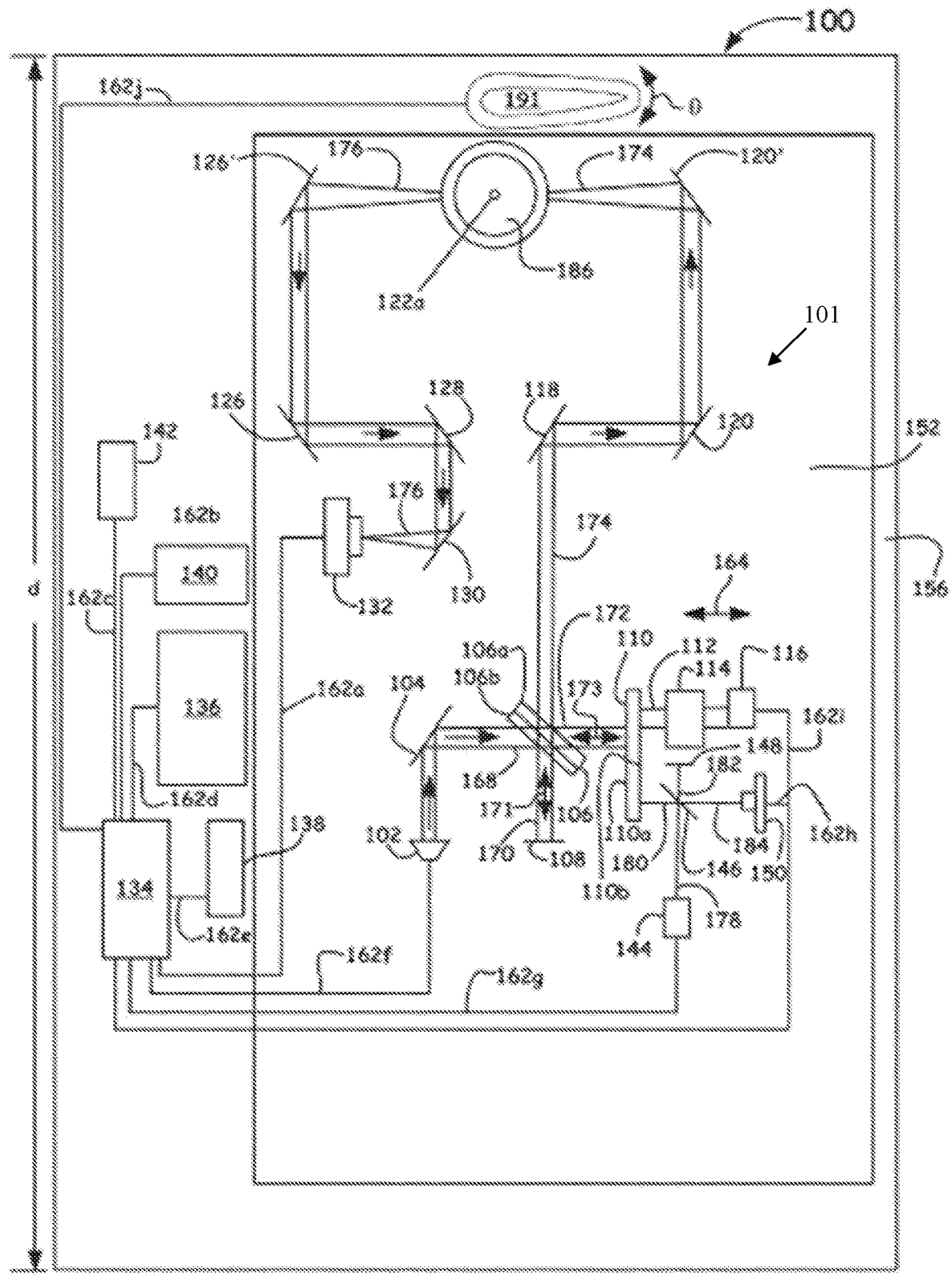
FIG. 1 illustrates a schematic of a measurement system, according to an aspect of this disclosure.

Certain terminology used in this description is for convenience only and is not limiting. The words "axial", "radial", "circumferential", "outward", "inward", "upper," and "lower" designate directions in the drawings to which reference is made. As used herein, the term "substantially" and derivatives thereof, and words of similar import, when used to describe a size, shape, orientation, distance, spatial relationship, or other parameter includes the stated size, shape, orientation, distance, spatial relationship, or other parameter, and can also include a range up to 10% more and up to 10% less than the stated parameter, including 5% more and 5% less, including 3% more and 3% less, including 1% more and 1% less. All ranges disclosed herein are inclusive of the recited endpoint and independently combinable (for example, the range of "from 2 grams to 10 grams" is inclusive of the endpoints, 2 grams and 10 grams, and all the intermediate values). The terminology includes the above-listed words, derivatives thereof and words of similar import.

In Fourier Transform Infrared (FTIR) spectroscopy, the unknown substance is illuminated with a broad-spectrum of infrared light, which can be absorbed by the sample of interest. The illumination via a source is often in the wavelength range from about 0.7 microns up to 25 microns. The light intensity as a function of wavelength is measured before and after interacting with the sample, and the absorbance caused by the sample is calculated. Light is absorbed in varying amounts by the sample at particular frequencies corresponding to the vibrational frequencies of the bonds of the molecules in the sample. Since the bonds for every molecule are different, the FTIR absorption spectrum for every molecule is also different. Thus, a spectral "fingerprint" can be generated by recording the absorbance of light as a function of wavelength.

With typical Attenuated total reflectance (ATR)/FTIR instruments, the conventional pressure arrangement uses drive screws, levers, and wedges to create pressure on the materials and requires the user to manually move the mechanism. Such conventional manual (e.g., knob driven) movement of the mechanism, however, tend to be large and unwieldy, and are also difficult to manipulate in ways that apply contact force repeatably or according to desired attributes such as a desired spectroscopy signature.

FIG. 1 illustrates a schematic of an ATR/FTIR measurement system 100, according to an aspect of this disclosure. The measurement system 100 includes various optical components mounted on an assembly support 152 within an enclosure 156. The instrument also includes a stage or platform 186 and a moveable contact member 191. The contact member 191 can move rotationally and/or vertically.

The optical components of the measurement system 100 can include an optical assembly 101. The optical assembly 101 can include radiation sources 102 and 144, mirrors 104, 108, 110, 148, 118, 120, 120', 126, 126', 128, and 130, beamsplitters 106 and 146, detectors and/or sensors 132 and 150, and an internally reflective element 122 (e.g. a prism). It will be appreciated that while mirrors 104, 108, 110, 148, 118, 120, 120', 126, 126', 128, and 130 of a certain number and as generally shown as planar in design, the mirrors and/or other optical elements can include refractive optical elements (e.g., lenses) as well as non-planar reflective elements can also be configured with other predetermined curvatures to provide the optical paths shown in FIG. 1. For example, such elements can be configured with concave, convex, parabolic, elliptical curvatures or any general surface needed to provide proper beam construction along any part of the beam paths as directed within system 100.

The system 100 further includes a shaft 112, a bushing 114, and an actuator 116 coupled to mirror 110, and an electronic processor 134, an electronic display 136 (e.g., including a flat panel display element such as a liquid crystal display element, an organic light-emitting diode display element, an electrophoretic display element, or another type of display element capable of touch-screen operation), an input device 138, a storage unit 140, and a communication interface 142. The electronic processor 134 can be in electrical communication with a light detector 132, a storage unit 140, a communication interface 142, a display 136, an input device 138, radiation sources 102 and 144, a detector 150, a contact member 191, and an actuator 116 via communication lines 162a-j, respectively.

The system 100 can be configured for use as an FTIR spectrometer during operation. It will be appreciated that the system 100 can be configured for other types of spectroscopy including, for example, ultraviolet, visible, Raman, or still other types of spectroscopy. The system 100 can provide light 168 via light source 102, which can be removable for ease of replacement, under the control of processor 134. The light 168 can include radiation from the light source 102, which can include a radiation source. The light 168 can be directed by mirror 104 to be incident on beamsplitter 106, configured as a beamsplitting optical element 106a and a phase compensating plate 106b to enable the received light 168 to be divided into two beams. Using such a configuration can enable a Michelson-type of interferometer to be formed, where a first beam 170 reflects from a surface of beamsplitter 106, propagates along a beam path which is parallel to arrow 171, and is incident on fixed mirror 108. Fixed mirror 108 thereafter reflects first beam 170 in an opposite direction so as to now be directed towards beamsplitter 106. A second beam 172 is transmitted through beamsplitter 106 and propagates along a beam path which is parallel to double arrow 173. Second beam 172 is incident on a first surface 110a of movable mirror 110 so that upon reflection is also directed towards beamsplitter 106.

First and second beams 170 and 172 are combined by the configuration of beamsplitter 106 and associated optics, which spatially overlaps the beams to form a modulated infrared radiation beam 174 (by way of operation of the configured Michelson interferometer) and is directed towards mirror 118. Thereafter, mirrors 118, 120, 120' direct modulated infrared radiation beam 174 to the internally reflective element 122 (depicted in FIG. 2). Once inside the internally reflective element 122 (often configured as a prism), beam of modulated infrared light 174 is directed to a contact surface face 122a (shown as a planar view in FIG. 1) of the internally reflective element 122. The contact surface face 122a of the internally reflective element 122 is positioned such that it contacts and supports a sample material 190 of interest, often the sample 190 has irregularities in surface construction (e.g., a powder). When modulated infrared light 174 is incident on the contact surface 122a, a portion of the radiation of modulated infrared light 174 is directed into the sample material 190 (See FIG. 2) through contact surface 122a via a desired evanescent wave effect. As part of the effect, the sample 190 desirably absorbs a portion of modulated infrared light 174 that is indicative of the structure and thus the properties of the sample material 190.

A total internal reflected portion 176 of modulated infrared light 174 includes a reduced amount of modulated radiation not absorbed by the sample 190. The reflected beam 176 is directed through a desired surface of the internally reflective element 122 and is thereafter directed by, for example, mirrors 126', 126, 128, and 130 in order to be interrogated by the system 100 via detection by light detector 132. In particular, under the control of processor 134, the light detector 132 can be configured to measure one or more properties of the sample 190 based on the reflected radiation in beam 176.

As stated above, the configured mirrors 108 and 110 together with beamsplitter 106 beneficially form a Michelson interferometer. In operation, by translating mirror 110 in a left-right direction (e.g. double-arrow 164) prior to each measurement, the plurality of measurements of the radiation in reflected beam 176 form an interferogram that includes information, such as sample absorption information. The processor 134 can be configured to apply one or more mathematical transformations (e.g., a Fourier transform) to the interferogram to obtain sample absorption information.

The mirror 110 can be coupled to the shaft 112, the bushing 114, and the actuator 116. The shaft 112 can move freely within bushing 114 and a viscous fluid is often disposed between shaft 112 and bushing 114 to permit relative motion between the two. Thus, the mirror 110 can move when the actuator 116 receives control signals from the processor 134 via communication line 162i.

To measure the position of mirror 110, the light source 144, the beamsplitter 146, the mirror 148, and the detector 150 can be configured to measure a position of the mirror 110. These components can be arranged to form a second Michelson interferometer. During a mirror position measurement of operation, the light source 144 (e.g., a monochromatic emission source (laser)) can receive a control signal from processor 134 via the communication line 162g, and generates a radiation beam 178. As an example of a desired source, light source 144 can be a configured vertical cavity surface-emitting laser (VCSEL) that generates radiation having a central wave-length of 850 nm. However, it is to be understood that source 144 can also include a wide variety of other sources, such as, laser diodes, light-emitting diodes, etc., capable of having radiation between 400 nm up to about 1200 nm.

The beam 178 can be incident on beamsplitter 146, which separates radiation beam 178 into a first beam 180 and a second beam 182. The first beam 180 can reflect from a surface of the beamsplitter 146 and can be incident on a second surface 110b of the mirror 110. The second surface 110b can be positioned opposite first surface 110a of the mirror 110. The first beam 180 can reflect from surface 110b and can return to the beamsplitter 146. The second beam 182 can be transmitted through the beamsplitter 146, reflected by mirror 148, and returned to the beamsplitter 146. The beamsplitter 146 can combine (e.g., spatially overlaps) reflected beams 180 and 182, and the spatially overlapped beam 184 can be directed to the detector 150. The detector 150 can receive control signals from the processor 134 via communication line 162k, and can be configured to measure an intensity of the combined beam 184. The combined beam 184 can provide an interference pattern that contains desired optical position information. Thus, the monitoring beam 184 can enable the position (and speed and tilt, if desired), of the mirror 110 to be precisely determined by counting the peaks and valleys in the amplitude of the beam 184.

As a beneficial aspect of the present application, absorption information can be compared by processor 134 to reference information (e.g., reference absorption information) stored in storage unit 140 to determine an identity of an unknown sample. For example, the processor 134, after a Fourier transform has been applied to the received reflected beam 176, can determine whether the absorption information for the sample matches any one or more of a plurality of sets of reference absorption information for a variety of substances that are stored as database records in the storage unit 140 or even from a database remotely located via wireless communication.

If a match is found (e.g., the sample absorption information and the reference information for a particular substance agree sufficiently), then the sample 190 is considered to be identified by processor 134. The processor 134 can send an electronic signal to display 136 along communication line 162d that indicates to a system operator that identification of the sample 190 was successful, and provides the name of the identified substance. If a match between the sample absorption information and the reference information is not found by processor 134, the processor 134 can send an electronic signal to display 136 that indicates to the system operator that sample 190 was not successfully identified, or that efficient optical coupling between the ATR contact surface 122a was not provided because of, for example, insufficient force applied by the contact member 191.

The communication interface can receive and transmit signals from/to the processor 134 via communication line 162c. The communication interface 142 can include a wireless transmitter/receiver unit that can be configured to transmit signals from the processor 134 to other devices, and to receive signals from other devices and communicate the received signals to the processor 134. For example, the communication interface 142 can permit the processor 134 to communicate with other devices via a wireless network that includes multiple devices connected to the network, and/or via a direct connection to another device. The processor 134 can establish a secure connection (e.g., an encrypted connection) to one or more devices to ensure that signals can only be transmitted and received by devices that are approved for use on the network.

The light source 102 can be configured as a replaceable component. The light source 102 can include a broadband radiation source configured to provide infrared radiation so that the system 100 can be operated as an infrared spectrometer. The infrared radiation provided by source 102 can include a distribution of wavelengths, with a center wavelength of the distribution of about 10 microns. In general, light source 102 can include a variety of sources known to those skilled in the art, including a heated infrared source chosen from any customized or conventional known source utilized in the field, such as, but not limited to, a wire, metal or ceramic element that can be heated to emit a continuous band of optical radiation.

Figure 2:
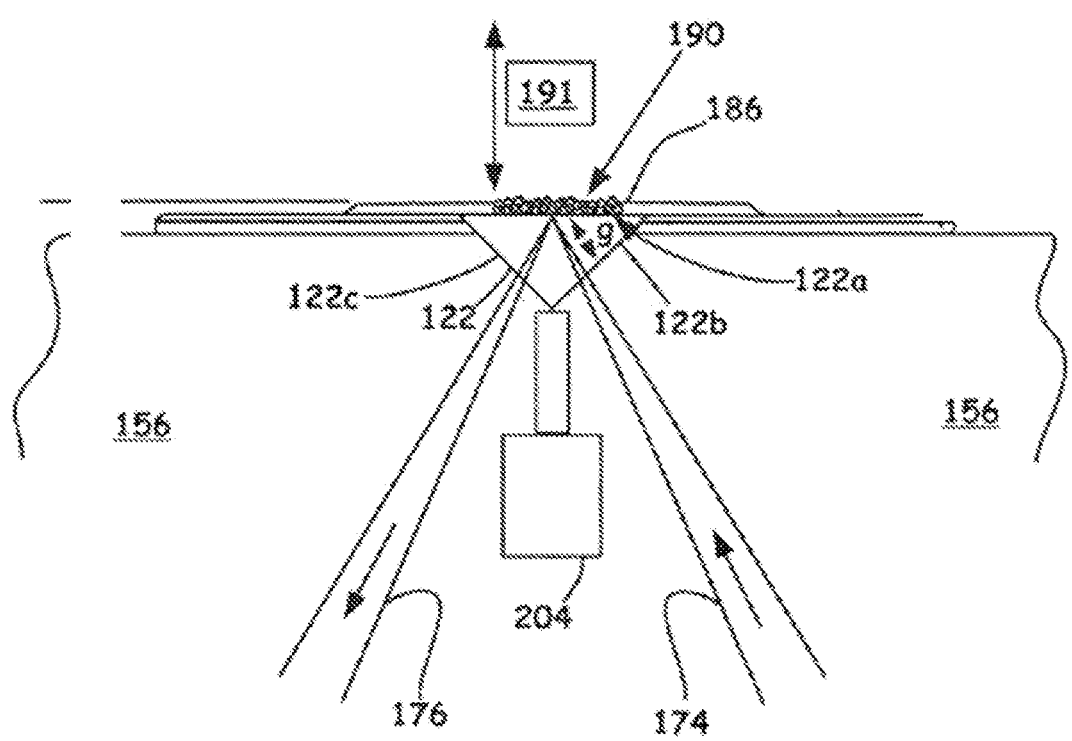
FIG. 2 illustrates a side schematic view of a portion of a measurement system, according to an aspect of this disclosure.

FIG. 2 illustrates a side schematic view of the stage 186 and the internally reflective element 122, according to an aspect of this disclosure. Axial movement between the stage 186 and the internally reflective element 122 can be substantially fixed. The internally reflective element 122 includes the contact surface 122a positioned to contact the sample 190. As illustrated, the sample 190 can include a powder that can be denoted by circles. It will be appreciated that the sample 190 can include a solid or a liquid. Light from the source 102 can enter the internally reflective element 122 through a surface 122b, and can leave the internally reflective element 122 through a surface 122c.

An edge of the internally reflective element 122 opposite to the contact surface 122a can be supported from below by a base 204. A coating (not shown), such as a metal (e.g., gold), is also often applied to the internally reflective element 122 to enable stable coupling to the top of configured surface 156 of the system 100, and to also provide support to the internally reflective element 122 from above. Support provided by the surface 156 and the base 204 allows the internally reflective element 122 to withstand significant applied forces during operation without being displaced from its mounting position.

Figure 3:
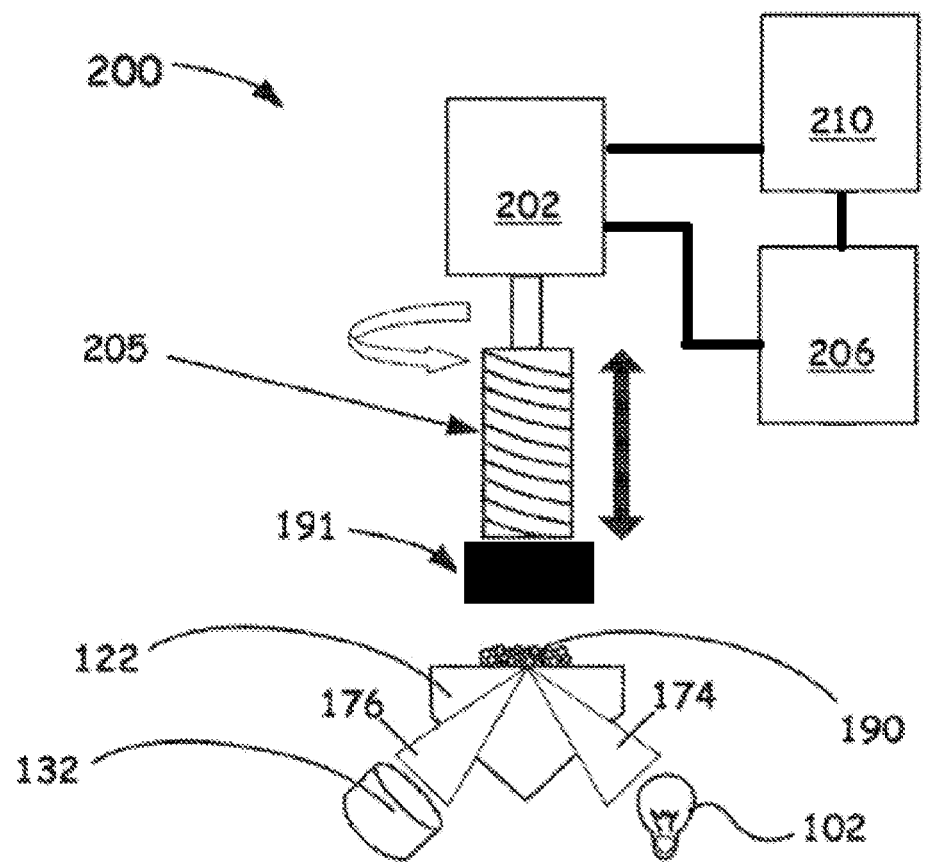
FIG. 3 illustrates a side schematic view of a force assembly of a measurement system, according to an aspect of this disclosure.

FIG. 3 illustrates a side schematic view of a force assembly 200 and the internally reflective element 122, according to an aspect of this disclosure. The force assembly 200 includes an actuator 202 and a translation member 205. The actuator 202 can include, for example, a motor (e.g., a DC motor) or a solenoid, an electromagnetic solenoid, or other type of force actuator (e.g., a piezo-electric driven mechanism, a linear motor, a rotary motor, a pneumatic or hydraulic actuator, etc.) that can be moved in a controlled manner. The translation member 205 can be connected to the contact member 191 to control a movement of the contact member 191. The translation member 205 can include a screw mechanism, a cam, or other mechanism to control linear and/or rotational motion of the contact member 191. In an aspect, the contact member 191 can be positioned axially above the internally reflective element 122. It should be understood, however, that the contact member 191 can be positioned in any orientation with respect to the internally reflective element 122. For example, the contact member 191 can be positioned below the internally reflective element 122 (e.g., where the contact member 191 drives up the internally reflective element 122). In another example, the contact member 191 can be positioned beside (laterally) with respect to the internally reflective element 122, which can be beneficial, e.g., in horizontally aligned systems. Further, in some cases the force assembly 200 can be implemented to apply a force to internally reflective element 122, as opposed to the contact member 191. For example, the contact member 191 can be statically positioned (e.g., adjacent to the sample 190), while the translation member 205 can be connected to the internally reflective element 122, which can drive the internally reflective element 122 into the sample 190. However, one skilled in the art will understand that other force mechanisms can be implemented to exert a force onto the internally reflective element 122, which can drive the internally reflective element 122 into the sample 190. Further, as shown in FIG. 3, the sample 190 can be in direct contact with the internally reflective element 122, such that force is applied to the sample 190 via at least one of the contact member 191 and the internally reflective element 122. However, in some cases, a platform, such as platform 186 as depicted in FIG. 2, can be used to support the sample 190 either in the z-direction (e.g., placed on top of the platform 186), laterally (e.g., placed within the platform 186), or both.

During operation, an operator can control the actuator 202 to cause the contact member 191 to apply a contact force to the sample material 190 against the contact surface 122a of the internally reflective element 122. The contact member 191 can be controlled to raise and/or rotate into position. The movement of the contact member 191 can provide intimate contact between the contact surface 122a and the sample material 190 to enable efficient coupling of the evanescent wave and improve a signal-to-noise ratio in measurements of reflected radiation beam 176. The support base 204 and surface 156 can ensure that the internally reflective element 122 remains in the same position on the platform 186.

The applied contact force by the contact member 191 onto the sample 190 can be a desired fixed force that can be a user-selectable force, or a desired force controlled through feedback from the spectrometer based on a spectrometer signature of the sample 190. For example, the user can select a fixed force to apply, and the contact member 191 can be controlled to apply the fixed force to the sample 190. Alternatively, the force applied to the sample 190 by the contact member 191 can depend on feedback by, for example, the light detector 132 (see FIG. 1) at a detection end of an optical beam path. As the force is being applied by the contact member 191, the system 100 can simultaneously and continuously query a signal strength provided by the light detector 132. If the signal strength (e.g. a sample spectroscopic signature strength) provides a reasonable signal, the contact member 191 stops and the force being applied to the sample 191 can be maintained. If the signal is not reasonable, the contact member 191 continues to increase a force and/or pressure applied to the sample 190 until a maximum allowable force can be applied or until an acceptable signal strength can be achieved. This operation allows the contact member 191 to stop moving as soon as there is enough contact force and/or pressure for a reasonable signal. It will be appreciated that other operations can be used to apply the force and/or pressure to the sample 190.

The measurement system 100 can further include a sensor 206 and a controller 210. The sensor 206 and the controller 210 can be operatively coupled to the actuator 202. The sensor 206 can be configured to detect the force and/or a pressure applied to the sample 190 by the contact member 191 and the internally reflective element 122. The sensor 206 can be located, for example, on the contact member 191, on or below the internally reflective element 122, on the translation member 205, or other location where the sensor 206 can detect a force applied to the sample 190. The sensor 206 can include, for example, a load cell, a strain gauge, a thin-film sensor, a hydraulic force sensor, or other force sensor/transducer or pressure sensor/transducer capable of detecting a force and/or a pressure applied to the sample 190 by the contact member 191 and the internally reflective element 122. It will be appreciated that the system 100 can include more than one sensor 206 operatively coupled to the actuator 202.

As shown in FIG. 3, the sensor 206 can be operatively coupled to the actuator 202. It will be appreciated that the sensor could be coupled to and/or positioned at different locations on the measurement system 100. For example, the sensor 206 could be directly coupled to the contact member 191, such that a force applied to the contact member 191 by the sample 190 can be detected by the sensor 206. In an alternative aspect, the sensor 206 can be positioned at other locations on the force assembly 200 to detect the force applied to the sample 190. In another alternative aspect, the sensor 206 can be positioned on the optical assembly 101 side of the measurement system 100. For example, the sensor 206 can be positioned below the sample 190 and/or in contact with the internally reflective element 122.

Figure 4:
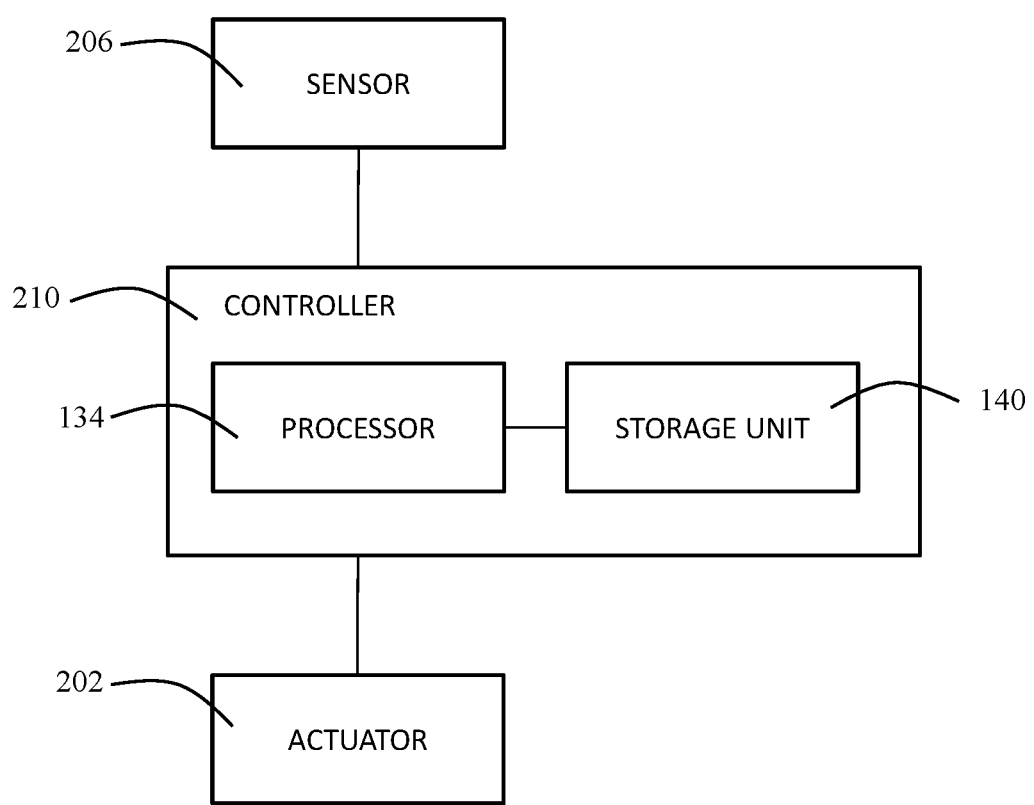
FIG. 4 illustrates a schematic of a controller, according to an aspect of this disclosure.

FIG. 4 illustrates a schematic of the controller 210, according to an aspect of this disclosure. The controller 210 can be operatively coupled to the sensor 206. In an aspect, the controller 210 comprises the electronic processor 134 and the storage unit 140. Alternatively, the controller 210 can include a separate processor and/or storage unit (not shown). The controller 210 can be configured to receive a signal from the sensor 206 indicative of the force and/or pressure applied to the sample 190 by the contact member 191 and the internally reflective element 122. The force and/or pressure data from the sensor 206 can be stored in the storage unit 140. Based on the force and/or pressure detected by the sensor 206 and transmitted to the controller 210, the controller can send a signal to the actuator 202 to adjust the force and/or pressure applied to the sample 190, as further described below.

Figure 5:
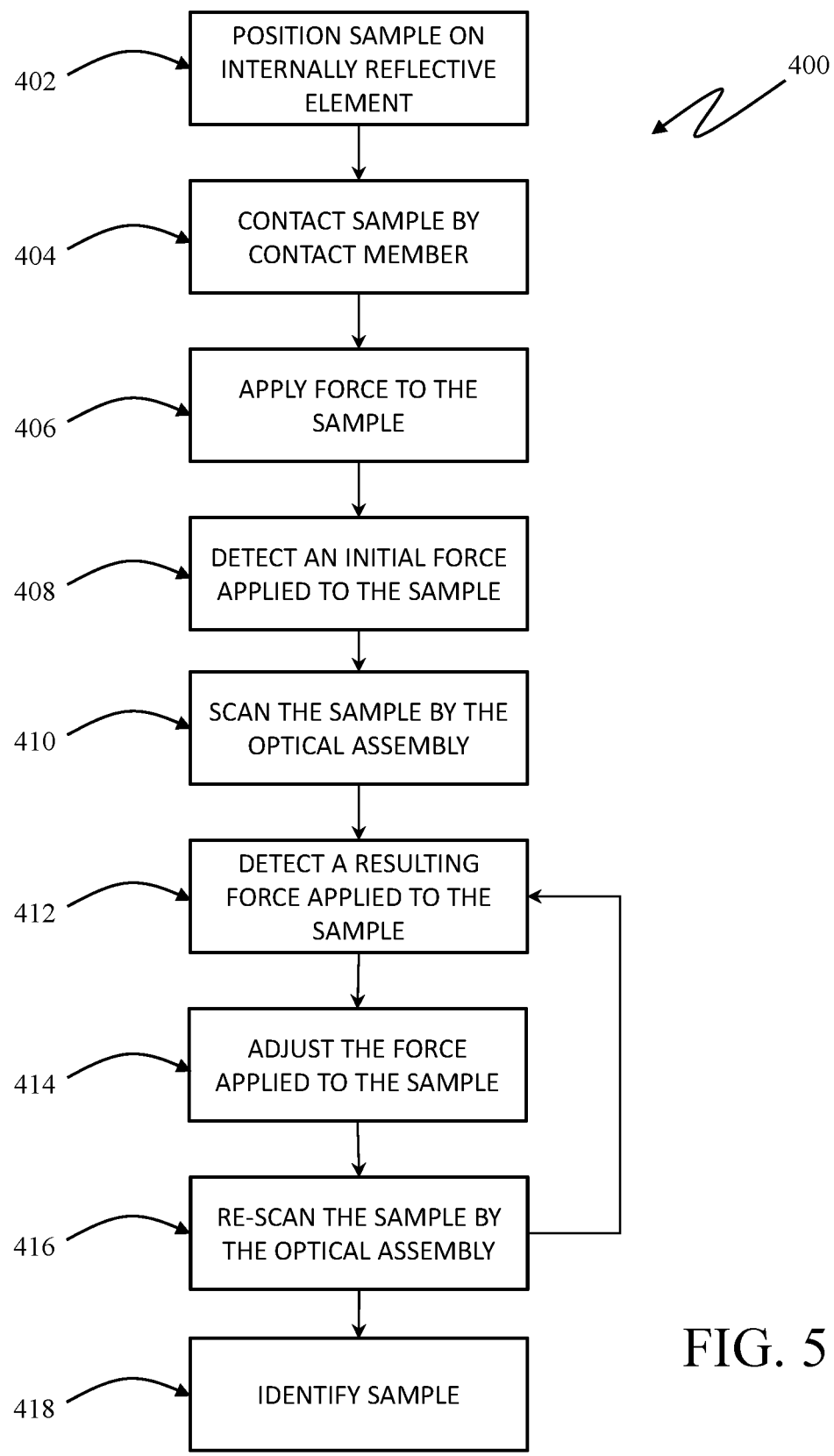
FIG. 5 illustrates a method of examining a sample with a measurement system, according to an aspect of this disclosure.

FIG. 5 illustrates a flowchart depicting a method 400 for examining the sample 190 with the ATR/FTIR measurement system 100, according to an aspect of this disclosure. At step 402, the sample 190 can be positioned on the contact surface 122a of the internally reflective element 122. In an aspect, the sample 190 can be placed toward a center of the internally reflective element 122 and at least partially below the contact member 191. After the sample 190 is placed on the contact surface 122a of the internally reflective element 122, at step 404, the contact member 191 contacts the sample 190 by moving toward the sample 190. At step 406, the contact member 191 can apply a contact force and/or pressure to the sample 190 against the contact surface 122a. As described above, the contact force and/or pressure applied to the sample 190 can include a desired force and/or pressure that is user selected, controlled by signal strength feedback, or a force determined by another method.

At step 408, the sensor 206 can detect an initial force and/or pressure applied to the sample 190 by the contact member 191 and the internally reflective element 122. The detected initial force and/or pressure can correspond to the desired contact force and/or pressure described above. Data indicative of the detected initial force and/or pressure can be stored in the storage unit 140 and/or a memory of the controller 210.

At step 410, the sample 190 can be scanned by the optical assembly 101 to identify the sample 190. It will be appreciated that the measurement system 100 can be configured to cooperate with other scanning or optical systems to identify the sample 190. For example, a handheld or non-handheld Raman scanning system can be used to identify the sample 190 based on Raman scattering information that can be sent to the system 100 via the communication interface 142. The scanning step can include directing source light from the light source 102 towards the contact surface 122a of the internally reflective element 122. The source light 102 optically interacts with the contact surface 122a. The source light 102 that optically interacts with the contact surface 122a can be detected by the light detector 132. The scanning step can be referred to as a forward sweep of the sample 190. After the scanning step, the optical assembly 101 can perform a backward sweep to re-position the optical assembly 101 for the next scan. During the backward sweep, the optical assembly 101 is not performing a scan (e.g. non-scan period of time).

As a result of the scanning step, the sample 190 can deform and/or degrade. The degradation can affect the contact force and/or pressure applied by the contact member 191 on the sample 190. For example, after a scan the contact pressure can be reduced, thereby affecting measurements made during successive scans of the sample 190. The force applied to the sample 190 by the contact member 191 can be adjusted prior to the optical assembly 101 performing the successive scans, as described below.

After the scanning step, at step 412, the sensor 206 detects a resulting force and/or pressure applied to the sample 190 by the contact member 191 and the internally reflective element 122. A signal indicative of the resulting force can be sent from the sensor 206 to the controller 210 to store in the storage unit 140 and/or a memory of the controller 210. The resulting force can be compared to the initial force to determine whether the resulting force is different than the initial force. The comparing step can be performed by the processor 134 or another processor of the controller 210.

If the resulting force is different than the initial force, the controller 210 sends a signal to the actuator 202 to adjust the force applied to the sample 190. At step 414, the actuator 202 adjusts the force applied to the sample 190 from the resulting force to the initial force. The force adjustment step 414 can be performed during the backward sweep of the optical assembly 101. The force can be adjusted by the actuator 202 by adjusting a distance between the internally reflective element 122 and the contact member 191. In an alternative aspect, the internally reflective element 122 can be axially fixed to the stage 186. In this aspect, the force can be adjusted by axially adjusting a position of the stage 186 (e.g. z-axis-controlled stage). The controller 210 can send a signal to an actuator (not shown) to adjust a height of the stage 186.

After the force applied to the sample 190 can be adjusted to the initial force, at step 416, the sample 190 can be re-scanned by the optical assembly 101. The re-scanning step 416 can include directing the source light from the light source 102 towards the contact surface 122a of the internally reflective element 122 and detecting the source light optically interacting with the contact surface 122a by the light detector 132. After the re-scanning step 416, steps 412, 414, and 416 can be repeated until sufficient information regarding the optical interaction with the sample 190 can be collected and stored in the storage unit 140 and/or memory of the controller 210.

After the information regarding the optical interaction with the sample 190 can be collected and complete, at step 418, the sample 190 can be identified.

The measurement system 100 described and illustrated herein includes the optical assembly 101 below and supporting the sample 190. It will be appreciated that the measurement system 100 can alternatively be configured such that the optical assembly 101 can be axially above the sample 190. For example, the sample 190 can be supported by the stage 186 and the axial spacing between the internally reflective element 122 and the stage 186 can be adjusted to affect the contact and the applied force on the sample 190. Either and/or both of the internally reflective element 122 and the stage 186 can be axially translatable to adjust the force on the sample 190.

It will be appreciated that the foregoing description provides examples of the disclosed system and method. However, it is contemplated that other implementations of the disclosure may differ in detail from the foregoing examples. For example, any of the embodiments disclosed herein can incorporate features disclosed with respect to any of the other embodiments disclosed herein. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

As one of ordinary skill in the art will readily appreciate from that processes, machines, manufacture, composition of matter, means, methods, or steps, presently existing or later to be developed that perform substantially the same function or achieve substantially the same result as the corresponding embodiments described herein may be utilized according to the present disclosure.

What is claimed:

1. A measurement system for examining a sample, the measurement system comprising:
    an internally reflective element having a contact surface configured to support the sample;
    a contact member positioned adjacent to the internally reflective element, wherein at least one of the contact member and the internally reflective element are configured to apply a force to the sample when the sample is positioned on the contact surface and the contact member is in contact with the sample;
    an actuator configured to adjust the force applied to the sample by the contact member and the internally reflective element;
    an optical assembly comprising a light source and a light detector, wherein the optical assembly is configured to scan the sample by directing source light from the light source towards the contact surface and detecting source light optically interacting with the contact surface by the light detector, wherein prior to the scan, an initial force is applied to the sample by the at least one of the contact member and the internally reflective element, and wherein after the scan, a resulting force is applied to the sample by the at least one of the contact member and the internally reflective element;
    a sensor configured to detect the resulting force applied to the sample by the contact member and the internally reflective element; and
    a controller configured to receive a signal from the sensor indicative of the detected resulting force, wherein the controller is further configured to:
        compare the initial force to the resulting force;
        determine that the initial force and the resulting force are different; and
        control the actuator to adjust the force applied to the sample by the at least one of the contact member and the internally reflective element from the resulting force to the initial force based on the determination that the initial force and the resulting force are different;
    wherein the measurement system is further configured such that after the force applied to the sample is adjusted to the initial force, the sample is re-scanned by the optical assembly.

2. The measurement system of claim 1, wherein the sensor comprises a load cell.

3. The measurement system of claim 1, wherein the sensor comprises a strain gauge.

4. The measurement system of claim 1, wherein the sensor is coupled to the contact member.

5. The measurement system of claim 1, wherein the actuator is configured to adjust a distance between the internally reflective element and the contact member.

6. The measurement system of claim 5, wherein the actuator is coupled to the internally reflective element via a stage, wherein axial movement between the stage and the internally reflective element is substantially fixed, and wherein the actuator is configured to axially adjust a position of the stage.

7. A method for examining a sample with a measurement system, the method comprising:
    positioning a sample on a contact surface of an internally reflective element;

contacting the sample by a contact member positioned adjacent to the internally reflective element;

applying a force to the sample with at least one of the contact member and the internally reflective element;

scanning the sample by an optical assembly comprising a light source and a light detector, the scanning comprising:

directing source light from the light source towards the contact surface, and detecting source light optically interacting with the contact surface by the light detector, wherein prior to the scan, an initial force is applied to the sample by the at least one of the contact member and the internally reflective element, and wherein after the scan, a resulting force is applied to the sample by the at least one of the contact member and the internally reflective element, wherein the resulting force is different than the initial force;

detecting, by a sensor, the resulting force applied to the sample by the at least one of the contact member and the internally reflective element;

comparing the initial force to the resulting force;

determining that the initial force and the resulting force are different;

adjusting, by an actuator, the force applied to the sample by the at least one of the contact member and the internally reflective element from the resulting force to the initial force based on the determination that the initial force and the resulting force are different; and after the force applied to the sample is adjusted to the initial force, rescanning the sample via the optical assembly.

8. The method of claim 7, further comprising:

receiving, by a controller, a signal from the sensor indicative of the detected resulting force; and controlling, by the controller, the actuator to adjust the force applied to the sample.

9. The method of claim 7, wherein the scanning step is a first scanning step, and wherein rescanning the sample further comprises:

directing light towards the contact surface by the light source, and detecting the source light optically interacting with the contact surface by the light detector, wherein prior to the scan, the force is adjusted to the initial force.

10. The method of claim 9, wherein after the first scanning step and before the re-scanning step there is a non-scan period of time, wherein the adjusting the force step occurs during the non-scan period of time.

11. The method of claim 7, wherein the adjusting step comprises adjusting a distance between the internally reflective element and the contact member.

12. The method of claim 11, wherein the actuator is coupled to the internally reflective element via a stage, wherein axial movement between the stage and the internally reflective element is substantially fixed, and wherein the adjusting step further comprises axially adjusting a position of the stage.

13. An attenuated total reflectance measurement system for examining a sample, the measurement system comprising:

a stage configured to support the sample;

an internally reflective element coupled to the stage such that axial movement between the stage and the internally reflective element is substantially fixed, the internally reflective element having a contact surface configured to support the sample;

a contact member positioned adjacent to the internally reflective element, wherein at least one of the contact member and the internally reflective element are configured to apply a pressure to the sample when the sample is positioned on the contact surface and the contact member is in contact with the sample;

an actuator configured to adjust a height of the stage to affect the pressure applied to the sample by the contact member and the internally reflective element;

an optical assembly comprising a light source and a light detector, wherein the optical assembly is configured to scan the sample by directing light towards the contact surface and detecting a source light optically interacting with the contact surface, wherein prior to the scan, an initial pressure is applied to the sample by the contact member and the internally reflective element, and wherein after the scan, a resulting pressure is applied to the sample by the contact member and the internally reflective element;

a sensor configured to detect the resulting pressure applied to the sample by the contact member and the internally reflective element; and a controller configured to receive a signal from the sensor indicative of the detected resulting pressure, wherein the controller is further configured to:

compare the initial pressure to the resulting pressure;

determine that the initial pressure and the resulting pressure are different; and control the actuator to adjust the height of the stage to change the pressure applied to the sample by the contact member and the internally reflective element from the resulting pressure to the initial pressure;

wherein the attenuated total reflectance measurement system is configured such that after the pressure applied to the sample is adjusted to the initial pressure, the sample is rescanned by the optical assembly.

\* \* \* \* \*